(No Model.) 2 Sheets—Sheet 1.
F. SACKETT & W. F. IRWIN.
STEAM TRAP.
No. 464,390. Patented Dec. 1, 1891.
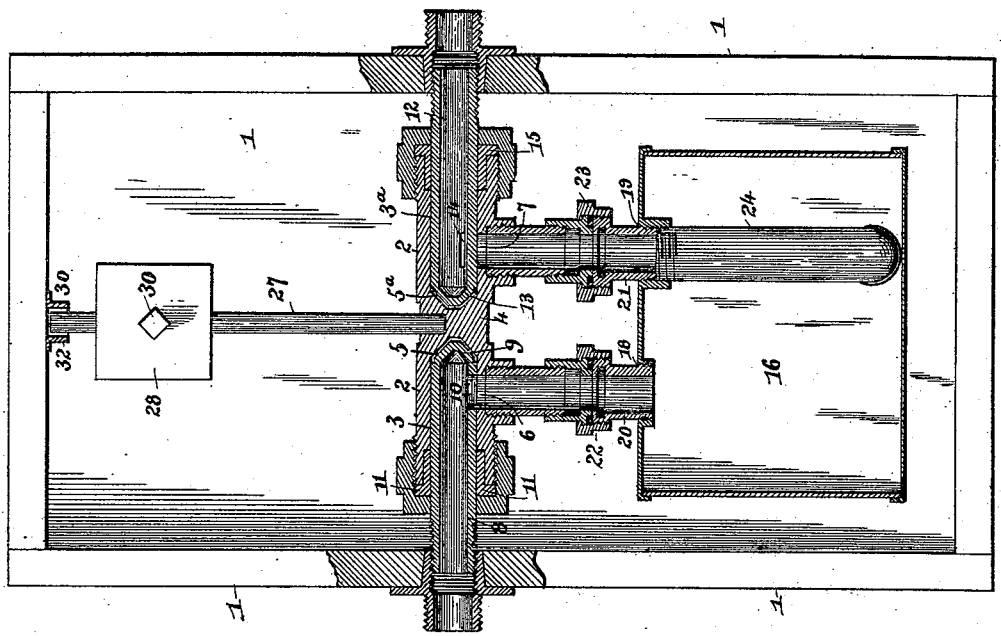
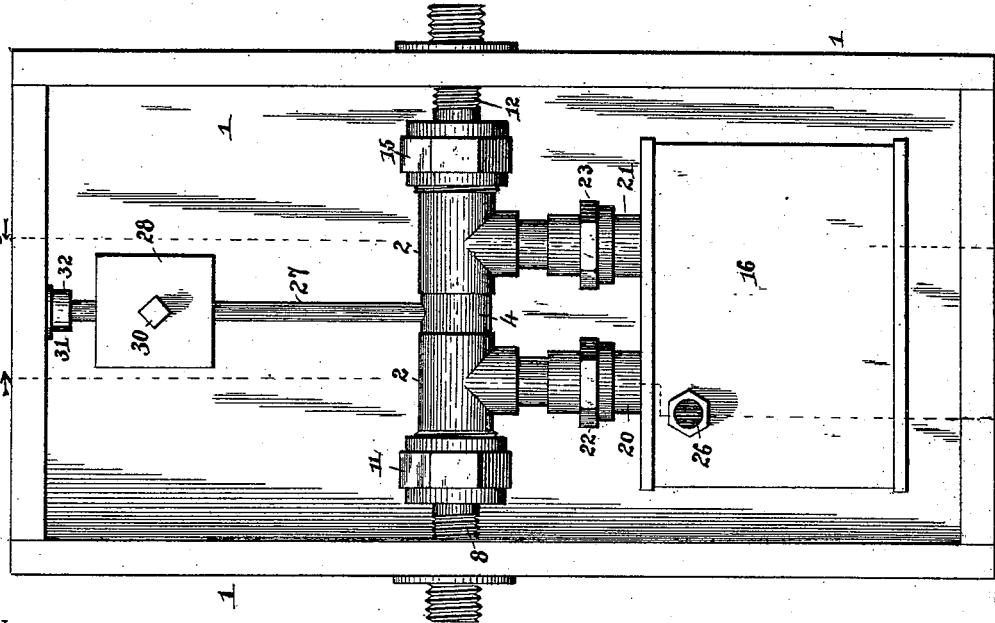
Witnesses
Inventors
Fred Sackett
W<sup>m</sup> F. Irwin
By their Attorneys, (No Model.) 2 Sheets—Sheet 2.
F. SACKETT & W. F. IRWIN.
STEAM TRAP.
No. 464,390. Patented Dec. 1, 1891.
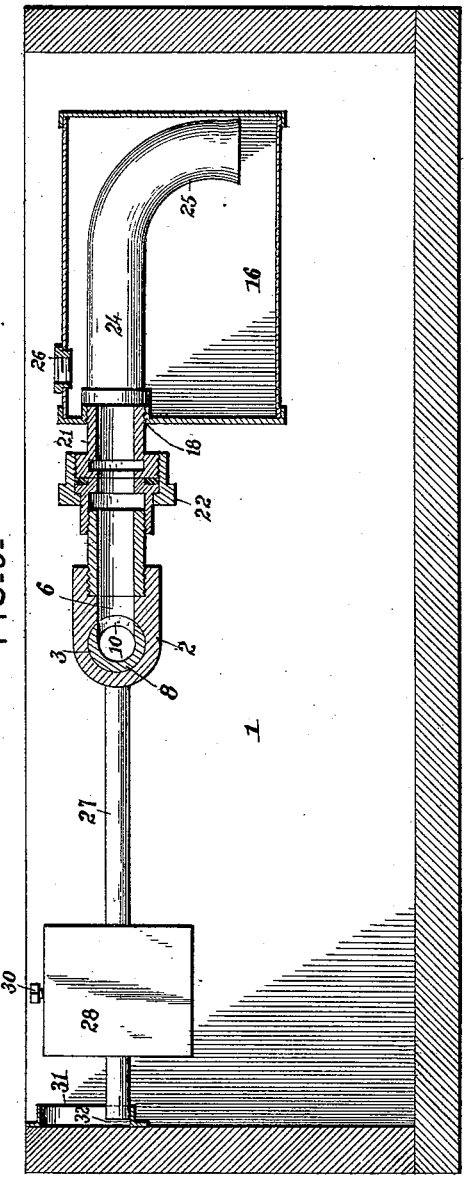
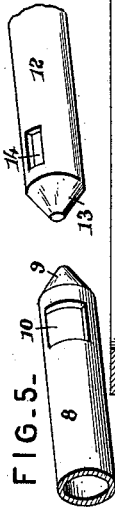
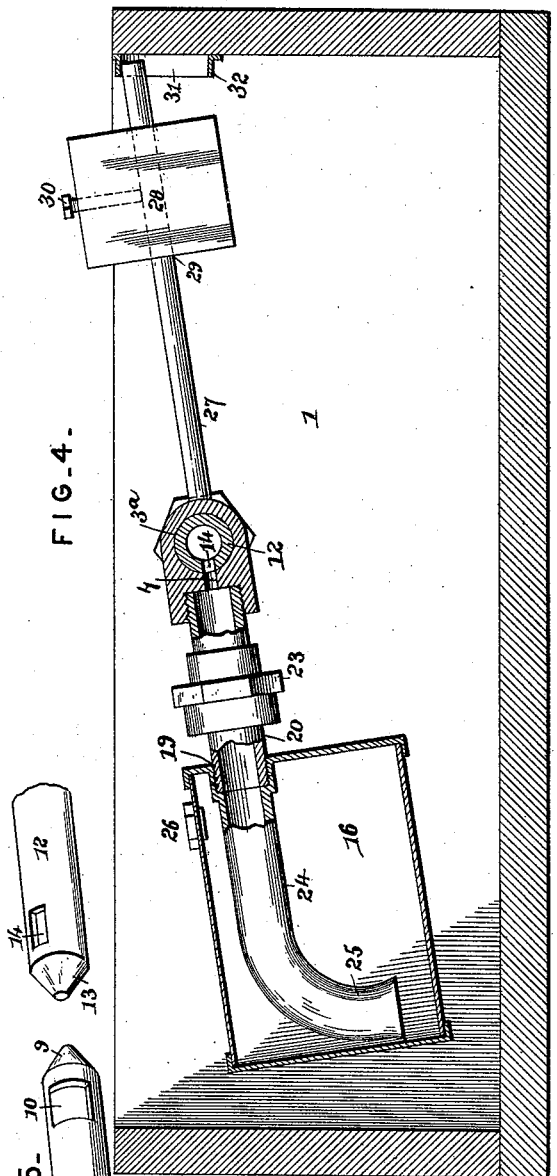
Witnesses
Jas. K. McCathran
[signature]
Inventors
Fred Sackett
Wm. F. Irwin
By their Attorneys,
C. A. Snow & Co.
THE NORRIS PETERS CO., PHOTO-LITHO., WASHINGTON, D. C.

UNITED STATES PATENT OFFICE.

FRED SACKETT AND WILLIAM F. IRWIN, OF CLEARFIELD, PENNSYLVANIA.

STEAM-TRAP.

SPECIFICATION forming part of Letters Patent No. 464,390, dated December 1, 1891.

Application filed August 1, 1891. Serial No. 401,409. (No model.)

*To all whom it may concern:*

Be it known that we, FRED SACKETT and WILLIAM F. IRWIN, citizens of the United States, residing at Clearfield, in the county of Clearfield and State of Pennsylvania, have invented a new and useful Steam-Trap, of which the following is a specification.

This invention relates to steam-traps used in connection with steam pipes, coils, &c., to take off the liquids of condensation, while at the same time it prevents a loss or escape of steam; and it has for its object to provide a device of this character that will automatically control the admission and discharge of the condensed vapors and provide a trap in which all the parts thereof are not under the water and therefore are not liable to get out of order or to become inoperative on account of clogging from sediment which may accumulate in the condensed vapors, and at the same time to provide a trap that may be easily constructed, repaired, and used at any convenient point that may be desired; and with these objects in view it consists in a counterbalanced receiver connected with an oscillating valve constructed and arranged in the novel manner hereinafter more fully described, illustrated in the accompanying drawings, and specifically pointed out in the appended claims.

In the accompanying drawings, Figure 1 is a top plan view of a steam-trap constructed in accordance with my invention. Fig. 2 is a vertical longitudinal sectional view of the same. Fig. 3 is a vertical longitudinal sectional view on line $x\,x$ of Fig. 1, illustrating the receiver in its normal position receiving the steam and condensed vapors. Fig. 4 is a similar view on line $y\,y$ of Fig. 1, showing the trap and weight counterbalanced and thus discharging its contents. Fig. 5 is a detail in perspective of the inlet and discharge tubes arranged in their relative positions.

Referring to the accompanying drawings, 1 represents a suitable boxing or casing entirely inclosed, if desired, within which the herein-described trap is designed to be located and operate; but said casing or boxing may be dispensed with, according to the positions in which the said trap is used.

2 indicates the valve-casing, designed to be oscillated alternately, and comprises the opposite hollow portions 3 and $3^a$ and the central solid portion 4, and is provided on opposite sides, at the inner ends of the chambers 3 and $3^a$ therein, with the conical valve-seats 5 and $5^a$, and communicating with said chambers are the outwardly-extending threaded perforations 6 and 7.

The inlet-pipe 8 comprises a tube having at its inner end the solid conical portion 9, which is adapted to snugly fit within the conical recess 5, located within said valve-casing, and is further provided with the rectangular opening 10, which is of sufficient width, as the casing 2 is oscillated upon said inlet-tube, to always register with the perforation 6, communicating with the chamber of the valve-casing in which said tube is located, said inlet-pipe being adapted to be connected by any suitable means and at any suitable distance to the steam-pipes from which the steam is admitted to within the trap, and said inlet-pipe is further adapted to be rigidly secured within one of the sides of the box or casing within which the trap is mounted, and thus insures a steady oscillation of the valve-casing thereover.

The valve-casing 2 is provided at the outer end of the chamber 3, within which the inlet-tube 8 is located, with a packing-box 11, of the ordinary construction, and is designed to make a steam-tight joint at the point where said inlet-tube enters the valve-casing in the ordinary manner.

Within the chamber $3^a$, opposite to that within which the inlet-pipe is located, the outlet tube or pipe 12 projects and is adapted to form the opposite bearing which supports the oscillating valve-casing. The said discharge-tube 12 is also provided with the closed conical end 13, which is designed to snugly fit within the conical recess $5^a$, located at the inner end of the chamber within which the said tube fits, and form a bearing when the pressure forces same against it, the same being further provided with the rectangular egress-opening 14, which registers with the perforation 7, communicating with the interior bore of the valve-casing, within which the discharge-tube is located, and is formed with a diameter of about half that of the diameter of the inlet-opening 10 in said inlet-tube and is closed and opened alternately by the oscillations of the valve-casing over both inlet and discharge tube, while the enlarged diameter of the rectangular inlet-opening is such as to allow a free passage to the steam and the liquids of condensation at all times. The outer end of the valve-casing at the point at which the discharge-tube enters the same is provided with the ordinary packing-box 15, similarly constructed and located to the packing-box upon the opposite end of said valve-casing.

The receiver 16 consists of a hollow box constructed of any suitable sheet metal, and is formed square, oblong, or circular, according to the different uses to which the trap may be placed. The said receiver is provided with the perforations 18 and 19, located in the end thereof and along and adjacent to one of the sides or edges of the same, and said perforations communicate with the inwardly-extending threaded extensions 20 and 21, which by means of suitable union connections 22 and 23 are connected with the threaded perforations 6 and 7, communicating with the inlet and outlet tubes, respectively, and thus provides direct or at least alternate communication between the inlet and outlet of the trap.

Extending inwardly from the opening 19, which is illustrated as the discharge-opening of the receiver, is the curved conducting-tube 24, which extends to one end of the receiver and is provided with a right-angular portion 25, extending along said end of the receiver from the top to within a short distance of the bottom, thus allowing the end thereof to be always covered with the water of condensation by being located at the very bottom of the receiver and prevents any steam from passing therethrough and up and out of the conducting-tube and the discharge-outlet. Undue pressure or presence of air within the receiver is compensated for by the automatic air-vent valve 26, located near the top of one of the sides of the receiver.

A balance-rod 27 is screwed within the top of the valve-casing 2, and is designed to accommodate the adjustable weight 28, provided with a central perforation 29, through which said rod is designed to pass and allow the weight to be adjusted at any point thereon by means of the set-screw 30, fitted within said weight and adapted to bear upon the rod upon which the same is adjusted. The said weight is designed to overbalance the receiver in its normal position when sufficient water has not collected within the same and to keep the discharge-opening closed until the same is counterbalanced by the weight of the collected water, at which time the weighted receiver oscillates the valve-casing and the weight thereupon and, throwing open the egress-valve, permits the water of condensation to be discharged. The balance-rod 27 is limited in its movement by means of the oblong stop 31, suitably secured to the top of the casing within which the trap is located, and is provided with a continuous flange 32, within which the free end of said balance-rod works and is accommodated, and is designed to travel in its oscillation from one end of said stop to the other.

The construction and operation of the herein-described steam-trap are now thought to be apparent without further description. It can be readily seen that the water of condensation upon entering the inlet-tube passes immediately therethrough and through the valve into the receiver beneath the same, which, being overbalanced by the weight secured to the oscillating valve, is in a position which closes the outlet-valve of the same. When sufficient water has collected, which may be regulated according to the position of the weight upon the balance-rod, the said weight is counterbalanced by the weight of the water in the receiver, which immediately causes the same to tilt and throw open the outlet-valve, and, inasmuch as the inlet-valve is of sufficient diameter to always be open, the water immediately escapes through the conducting-tube and out through the discharge-tube of the trap until the weight of the same within the receiver is again overcome by the weight upon the balance-rod, which immediately causes the receiver to assume its normal position and cut off the egress of the water until sufficient condensation has been received within the receiver to cause the operation to repeat itself. From the foregoing it will be seen that while during the oscillations of the valve back and forth over the inlet and discharge tubes the inlet-valve is always open and the outlet-valve is only alternately open and shut, according to the weight of the water in the receiver, thus by the overbalancing of the weight and counterbalancing of the same by the water of condensation within the receiver an automatically and continuously operating trap is provided, which, while allowing for the discharge of water when any amount desired has been received within the receiver at the same time provides a perfect water-seal at the point of outlet through the discharge-tube, so that at no time can steam be expelled.

While the arrangement of the balance-rod and weight provides for a discharge with any amount of water in the receiver, it at the same time provides a device that may be regulated and rendered available for use under any pressure, and the arrangement and construction of the stop render the liability of the trap coming to a dead-center impossible.

It is to be noted that sufficient space is left between the conical ends of the inlet and discharge tubes to allow for expansion from heat and thus prevent the valve from binding tight and becoming inoperative, and the play also allows the conical end of the discharge-tube to be pushed within the recess of the valve-casing when the pressure coming through the inlet-tube forces the same thereagainst and thus provides a bearing which will have little or no friction. The said inlet and discharge tubes, as has already been stated, are not tapered, but are ground straight into the chambers 3 and 3ª, by means of which the valve cannot possibly bind with either the expansion or with any pressure that may be at the inlet.

Having thus described our invention, what we claim, and desire to secure by Letters Patent, is—

1. In a steam-trap, a valve-casing oppositely chambered and having side openings communicating with each chamber, independent stationary inlet and discharge tubes located within said valve-casing, and upon which the same is designed to oscillate, and provided with openings of different diameters adapted to communicate with said casing-openings, a receiver connected with said casing and communicating with the opposite openings in each chamber thereof, and a counterbalancing-weight adjustably secured to said oscillating valve, substantially as set forth.

2. In a steam-trap, an oscillating valve-casing oppositely chambered and provided with packing-boxes at the outer ends and conical recesses at the inner extremities of said chambers, stationary inlet and discharge tubes provided with closed conical ends located within said valve-casing and bearing within said conical seats therein, a receiver connected with said casing and communicating with the opposite chambers thereof and the inlet and discharge tubes therein, and a counterbalancing-weight adjustably secured to said oscillating valve, substantially as set forth.

3. In a steam-trap, a double oscillating valve-casing having opposite chambers and inlet and discharge openings therein, independent and separate stationary inlet and discharge tubes supporting said valve-casing and having openings of different diameters communicating with the inlet and discharge openings in the valve-casing, a counterbalancing-weight, a receiver connected with each opening in said oscillating valve-casing and provided with inlet and discharge openings, a curved conducting-tube connected with the discharge-opening of said receiver and projecting from said outlet to within a short distance of the bottom of said receiver, and an automatic vent-valve, substantially as set forth.

4. In a steam-trap, a double oscillating valve-casing having opposite chambers and inlet and discharge openings therein, independent and separate stationary inlet and discharge tubes supporting said valve-casing and having openings of different diameters communicating with the openings in the valve-casing, a counterbalancing-weight, and a receiver connected with each opening in said oscillating valve-casing and provided with an inlet-opening continuously open during the operations of the valve, an egress-opening alternately controlled by said oscillating casing, a curved conducting-tube connected with said egress-opening and having a portion projecting from the outlet of the receiver to the end thereof, and a right-angularly-disposed portion located along the end of the receiver and connected with said depending portion, and an automatic vent-valve, substantially as set forth.

5. In a steam-trap, an oscillating valve-casing oppositely chambered and provided with packing-boxes at the outer ends, conical recesses at the inner extremities of said chambers and perforations communicating with said chambers, stationary inlet and discharge tubes located within opposite ends of said valve-casing and provided with closed conical ends bearing within said conical seats or recesses and slotted openings of different diameters registering with the perforations in said valve-casing, the said ingress-opening being designed to be continuously open during the operation of the valve and the egress-opening alternately controlled by the same, a receiver connected with said casing and communicating with the opposite perforations therein and the inlet and discharge tubes, a counterbalancing-weight adjustably secured to said oscillating valve, and an elongated flanged stop designed to limit the movement of said weight, substantially as set forth.

In testimony that we claim the foregoing as our own we have hereto affixed our signatures in presence of two witnesses.

FRED SACKETT.
WILLIAM F. IRWIN.

Witnesses:
S. I. BURGE,
GEO. I. THOMPSON.